United States Patent [19]
Sandford, II et al.

[11] Patent Number: 5,970,140
[45] Date of Patent: Oct. 19, 1999

[54] MODULAR ERROR EMBEDDING

[75] Inventors: Maxwell T. Sandford, II; Theodore G. Handel; J. Mark Ettinger, all of Los Alamos, N. Mex.

[73] Assignee: The Regents of the University of California, Los Alamos, N. Mex.

[21] Appl. No.: 08/646,837

[22] Filed: Aug. 2, 1996

[51] Int. Cl.⁶ .................................................. H04N 7/167
[52] U.S. Cl. ..................... 380/7; 380/10; 380/54
[58] Field of Search ................................. 380/7, 10, 49, 380/54; 707/101

[56] References Cited

U.S. PATENT DOCUMENTS

| | | | |
|---|---|---|---|
| 4,949,381 | 8/1990 | Pastor | 380/54 |
| 4,972,476 | 11/1990 | Nathans | 380/54 X |
| 5,291,243 | 3/1994 | Heckman et al. | 380/54 X |
| 5,321,749 | 6/1994 | Virga | 380/54 X |
| 5,398,283 | 3/1995 | Virga | 380/54 X |
| 5,488,664 | 1/1996 | Shamir | 380/54 |
| 5,493,677 | 2/1996 | Balogh et al. | 707/104 |
| 5,659,726 | 8/1997 | Sandford, II et al. | 707/101 |
| 5,721,788 | 2/1998 | Powell et al. | 380/54 X |
| 5,727,092 | 3/1998 | Sandford, II et al. | 382/251 |

*Primary Examiner*—George Dombroske
*Assistant Examiner*—Paul D. Amrozowicz
*Attorney, Agent, or Firm*—Milton D. Wyrick

[57] ABSTRACT

A method of embedding auxiliary information into the digital representation of host data containing noise in the low-order bits. The method applies to digital data representing analog signals, for example digital images. The method reduces the error introduced by other methods that replace the low-order bits with auxiliary information. By a substantially reverse process, the embedded auxiliary data can be retrieved easily by an authorized user through use of a digital key. The modular error embedding method includes a process to permute the order in which the host data values are processed. The method doubles the amount of auxiliary information that can be added to host data values, in comparison with bit-replacement methods for high bit-rate coding. The invention preserves human perception of the meaning and content of the host data, permitting the addition of auxiliary data in the amount of 50% or greater of the original host data.

12 Claims, 13 Drawing Sheets

Balloons.bmp, Original Image

Balloons.bmp, 3-bits

Rocks.bmp, original image

Rocks.bmp, 6-bits

```
/****************************************************************************
 * EmbedModError: Routine to perform modular error embedding
 * INPUT: *pixel, Pointer to the pixel data value
 *        *maxval, Pointer to the number of bits embedded
 * RETURN: nothing
 *
 * M. T. Sandford II, 12/5/95 (following work with Mark Ettinger)
 *
 ****************************************************************************/ void CEmbedBitmapFile::EmbedModError(unsigned char *pixel, unsigned
                                     long *maxval) {
    short x1, x2;         /* block no. and offset of the pixel value */
             short y;     /* value to embed */
    short f;              /* new pixel value that codes y */ f = (int)*pixel;
    x2 = f%mod_block_size;   /* block index of pixel value */
        x1 = f/mod_block_size;

y = GetBits(no_bits_sliced);   /* get the bit sequence to embed */ if(abs(x2-y) <= mod_block_size/2) f = mod_block_size*x1 + y;
    else if(x2 > mod_block_size/2 -1) f = mod_block_size*(x1+1) + y;
                            else {
                    if(x1) f = mod_block_size*(x1-1)+y;
                            else f = y;
                            }
```

Fig. 11A

```
// bound range of result
if(f > WHITE) f -= mod_block_size;
if(f < BLACK) f += mod_block_size;
    *pixel = (unsigned char)f;
    *maxval += no_bits_sliced;
            return;
        }
```

Fig.11B

```
/*******************************************************************************
 * ExtractSlicedBits: Routine to perform modular error embedding
 * INPUT: *pixel, Pointer to the pixel data value
 *   *maxval, Pointer to the number of bits extracted
 * RETURN:  success/fail flag from PutBits() routine
 * AUTHOR:
 * M. T. Sandford II, 12/5/95 (following work with Mark Ettinger)
 *      revised 2/28/96 for CExtractBitmapFile::
 *******************************************************************************/ short CExtractBitmapFile::ExtractSlicedBits(unsigned char *pixel, unsigned long *maxval)
{
            short y;      /* value extracted */
            short f;            /* the pixel value in the image */
            short j;      // return value ==-1 if the header did not verify
                unsigned char c;   /* output data value */ f = (short)*pixel;
            y = f%data_header.mod_block_size;
                c = (unsigned char)y;

j = PutBits(c,data_header.no_bits_sliced);    /* send the bit sequence to the data image */

*maxval += data_header.no_bits_sliced;
                        return j;
                        }
```

MODULAR ERROR EMBEDDING

This invention was made with Government support under Contract No. W-7405-ENG-36 awarded by the U.S. Department of Energy. The Government has certain rights in the invention.

FIELD OF THE INVENTION

The present invention generally relates to digital manipulation of numerical data in which low-order bits can be modified without affecting the meaning and content of the numerical data. More specifically, the invention consists of a means for the embedding of large amounts of external data into the numerical values used to represent a digital image.

Many digital representations of image data have resolutions in the component intensities greater than is required to represent the meaningful content of the information. Digital images in Truecolor format commonly use eight binary bits of information for each of the three primary colors, for a total of 24-bits resolution. However, in many situations, fewer than 24 bits resolve the image adequately to convey meaning and content. Moreover, in all situations for which the digital data originate from the conversion of an analog signal, the lowest bits contain noise introduced by the conversion process. For images, variations in optical focus, film grain, video signal variations, and scanner errors are common sources of noise in the lowest few bits of the data values.

For noisy data, the low-order bits can be replaced and used as containers for auxiliary information. Modular error embedding is a new method for modifying the low-order bits in host data to insert auxiliary data, with less error than is caused by methods that replace these bits directly with the auxiliary data. Modular error embedding as taught herein provides invisibility of the auxiliary information, as disclosed in copending U.S. patent application Ser. No. 08/392, 642, filed Feb. 23, 1995, for DATA EMBEDDING.

A method to represent separate information, in the form of an electronic indicia, created specifically to authenticate host image data is taught in U.S. Pat. No. 4,949,381, issued Aug. 14, 1990, to Pastor and assigned to Pitney Bowes, Inc., Stamford, Conn. Modular error embedding according to the present invention teaches a method wherein no separate indicia is required. The machine readable auxiliary data inserted by modular error embedding are visible to humans only as noise in the host data. The level of the noise, and its consequent visibility, is determined by the number of low-order bits used to embed the auxiliary information.

High bit-rate coding is reviewed by W. Bender, D. Gruhl, and N. Morimoto, "Techniques for Data Hiding," in Proceedings of the SPIE, Storage and Retrieval for Image and Video Databases III, V.2420, 164–173, 1995. Bender et. al. refer to simple replacement of the least significant bit of the image data as the most common high-bit rate coding method, and to spectral methods as less common methods.

Modular error embedding is a high-bit rate coding method using more than one bit of host information while introducing one bit less of noise into the host data. The auxiliary data added by modular error embedding can be made invisible to humans, and it codes auxiliary data at much higher bit-rates than the least significant bit methods. The selection of the picture elements, or pixels, for embedding is guided by a digital key which may be protected by the use of public key encryption systems, such as the generally known RSA encryption system.

Modular error embedding is a modification of data embedding as taught in the above co-pending application. As disclosed in the above-mentioned copending application for DATA EMBEDDING, the auxiliary data are embedded using methods to constrain the process to manipulate only the noise component of the host data, and not to modify any host data values. The copending DATA EMBEDDING application constraints restrict significantly the amount of information that can be embedded into a host. Modular error embedding permits adding large amounts of auxiliary information to host data.

Data embedded into the host image with modular error embedding are recovered by processing the digital image in machine readable, digital form. Human readable versions of images containing auxiliary data, for example images displayed on a screen or printed from the digital data, cannot be processed to recover the embedded information. The total amount of information in the host image is unchanged by modular error embedding, in concert with the copending DATA EMBEDDING application, and in contrast with the aforementioned Pastor method which conveys data in a separate, visible bit-mapped electronic indicia.

It is therefore an object of the present invention to provide apparatus and method for embedding data into a digital information stream so that the meaning and content of the digital information is not changed significantly.

It is another object of the present invention to provide apparatus and method for reducing the error caused by the added information, and for thwarting unauthorized access to information embedded into host data.

It is yet another object of the present invention to provide apparatus and method for allowing authorized extraction of embedded data from a digital information stream.

Additional objects, advantages, and novel features of the invention will be set forth in part in the description which follows, and in part will become apparent to those skilled in the art upon examination of the following, or learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the method of embedding auxiliary data into digital host data of any kind containing noise in the low-order bits comprises the steps of selecting values from the digital host data in a sequence determined by a digital key; creating a digital representation of the auxiliary data in the form of a sequence of individual bit values; representing the digital host data value as a block of value having a center and an offset value obtained from the center of said block; replacing individual host data values with a second block offset value determined from the auxiliary data; and outputting the replacement values with the auxiliary data embedded into a file format specified for the digital host data.

In another aspect of the present invention, and in accordance with its principles and objects, a method of reconstructing auxiliary data from a machine readable digital host data representation into which the auxiliary data has been emedded comprising the steps of extracting the auxiliary data from the host data representation in a sequence determined by a digital key; interpreting the extracted auxiliary data according to the remainder values of a block size that is a binary power of two; and verifing the validity of the auxiliary data by examining the content of the remainder values.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 11 is a partial listing of computer code used for calculating the block and offset values and the new host data value.

FIG. 12 is a partial listing of computer code used for extracting embedded data.

DETAILED DESCRIPTION

The present invention allows data to be embedded into the low-order bits of host data with less error than would be caused by replacing the bits with either the bits or a code representing the bits taken from the auxiliary data. This is made possible because of the technique of selecting a block module in the host data, and representing the embedded bits by an offset from the center of the block module.

In the present invention, the auxiliary data are encrypted or compressed before the modular error embedding process is begun, in order to randomize the auxiliary bits, and to minimize the effect of the auxiliary data on the noise in the low-order bits of the host data. After this is accomplished, the correlation of the host and auxiliary data values are used to reduce further the error caused by applying the method of the current invention. The auxiliary data placed into the low-order host image data bits are made to correlate with the host image data by permuting the order in which the host data pixels are sampled for embedding, reducing further the noise introduced into the host data. This permutation is different than permuting the order of pixel selection from the host image, because it applies to sequences of pixels, after the pixels are drawn from the image. This process is accomplished concurrently with other steps of the method according to the present invention.

Embedding information with modular error embedding affects the response of the host data to standard loss-less compression algorithms. Data added in the low-order bits, even when correlated with the host image noise, increase the image entropy. However, the compressed size of the host image after the method of the present invention adds auxiliary data is less than the sum of the separate compressed sizes of the original host and the auxiliary data. Therefore the present invention provides a means for increasing to a large amount (high bit-rate coding) the information that can be conveyed in digital data containing intrinsic noise.

Figure 1:
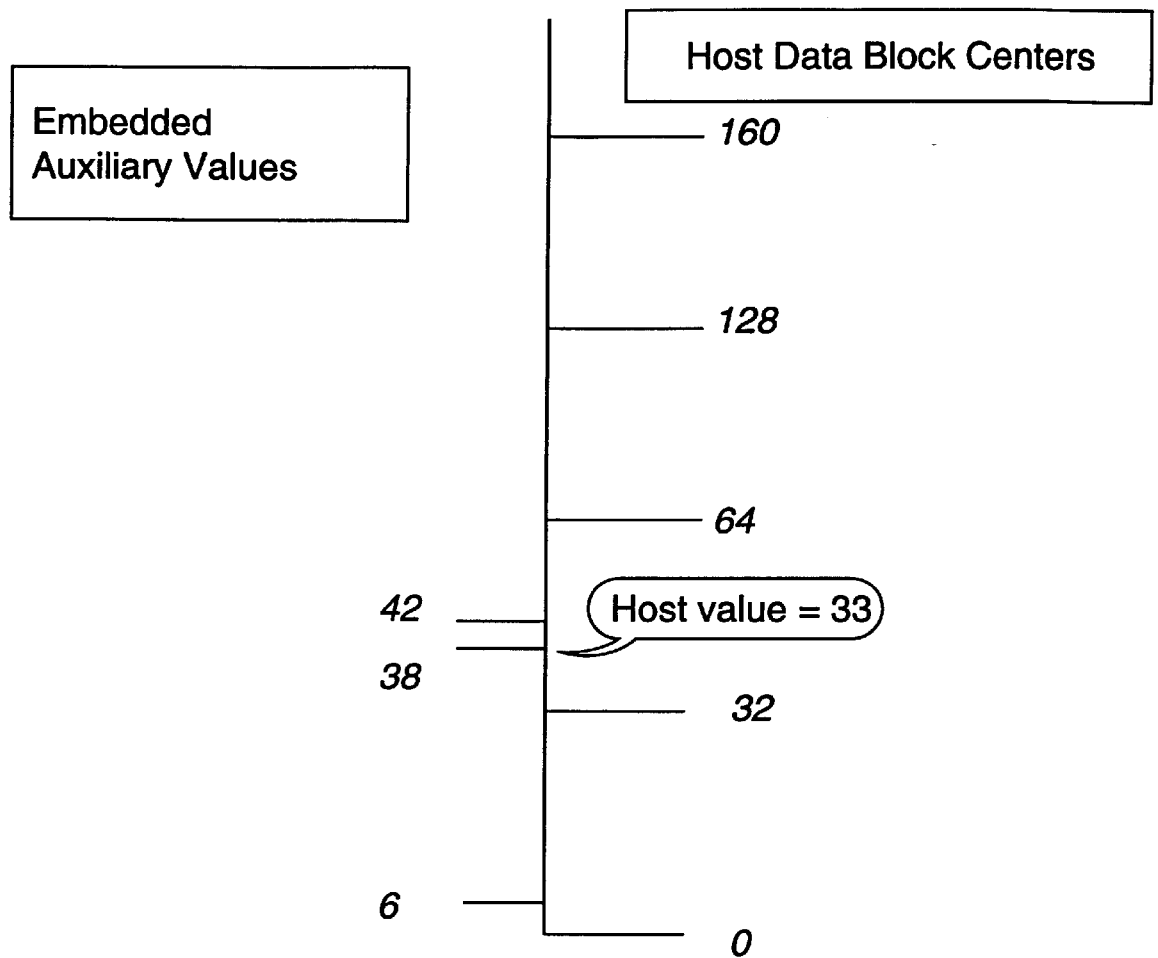
FIG. 1 is a diagram illustrating the reduction of error given by selecting the host image value replacement from within a modular error embedding block.

FIG. 1 illustrates some examples of the process of the present invention. Vertical line 1-1 represents the scale for numerical values. For n=5 bit embedding, the auxiliary data samples range in value from 0 to 31, inclusive. The original host data values fall anywhere on the line 1-1. Numbers by the short tick marks on the right side of vertical line 1-1 represent the block module values in the original host data. Numbers on the left side of vertical line 1-1 represent host data values used for embedding. The new host data values, after embedding, are shown in parentheses on the left side of vertical line 1-1. The values embedded, in the three examples following are shown on the right side of the vertical line 1-1.

For the five low-order bits in this example, n=5, and the embedding block, or module, size is $2^n$=32. The invention partitions the host data values into blocks, or modules 32 units in size. FIG. 1 shows modules centered at 0, 32, 64, and 128 units.

Assume the auxiliary data value is 6, and the host pixel value is 29. Replacing the five low-order host value bits with the auxiliary value, as in bit-slicing methods, introduces an error of 23.

Again referring to FIG. 1, the invention embeds the auxiliary data value 6 as an offset 6 units above the block centered at 32. The new host data value is 38, and the error is 9. To recover the auxiliary value, the invention calculates the remainder of the new host data value, 38, modulo the block size, 32. The remainder is the auxiliary value, 6. In this case, the invention changes the host block index, which is the sixth bit, from 0 (the block starting at 0) to 1 (the block starting at 32).

In a second example, for which the auxiliary data value is 31, and the host value is 33, the difference between the auxiliary value and the host value is 2. Embedding with bit slicing would set the new host data value to 63, and introduce an error of 30. The invention sets the new host value to 31, so the error is 2. To recover the auxiliary value, the invention calculates the remainder of the new host data value, 31, modulo the block size, 32. The remainder is the auxiliary value, 31. In this case, the invention changed the block index, which is the sixth bit, from 1 (the block starting at 32) to 0 (the block starting at 0).

In yet a third example, for which the auxiliary data value is 16, and the host value is 33, the difference between the auxiliary and host values is 17. For this case, the invention sets the new host value to 48, so the error is 16. The auxiliary value is the remainder of the new host data value modulo the block size, 32. The remainder is 16. In this case, the host data value block index is not changed and the invention performs identical to bit slicing.

With modular error embedding, the maximum error is one-half the block size. With bit-slice methods, the maximum error equals the block size. Changing the block index, i.e., the $(n+1)^{th}$ bit, reduces the embedding error by bringing the host and auxiliary bits closer in value. In the third example, the block index is not changed. In the first and second examples, the invention changes the block index, the sixth bit, when the lowest five bits are replaced.

The method of the present invention proceeds in three steps. First, a host data value, h, is drawn from the host image and represented by a block index, $X_1$ and an offset value, $X_2$, according to $$h=2^n X_1 + X_2. \qquad 1)$$

Values of the block index and offset are found from truncated integer division and the remaindering operation:

$$X_1 = h/2^n; \; X_2 = h \bmod(2^n). \qquad 2a,b)$$

In the second step, n-bits of auxiliary data are drawn and the auxiliary value, y, is used to calculate a new host data value, h'. The algorithm for finding h' is:

$$\text{if } |y - X_2| \leq 2^{n-1}, \; h' = 2^n X_1 + y, \qquad 3a)$$

$$\text{else if } X_2 > 2^{n-1} - 1, \; h' = 2^n (X_1 + 1) + y, \qquad 3b)$$

$$\text{else } h' = 2^n (X_1 - 1) + y. \qquad 3c)$$

In the third step, the host data value h is replaced with h'. The algorithm in Equations. 3a–c constrains h', the new host data value, to less than $2^{n-1}$, or a factor of 2 less than the error range possible for bit-slicing n-bits of the data value. Hence, for the same degradation of the host data values, the invention embeds double the amount of auxiliary information.

A single step is required to recover the data value y, from its host data value, h'. To extract an embedded value, the invention calculates the remainder of the host value:

$$y = h' \bmod(2^n). \qquad 4)$$

Figure 2:
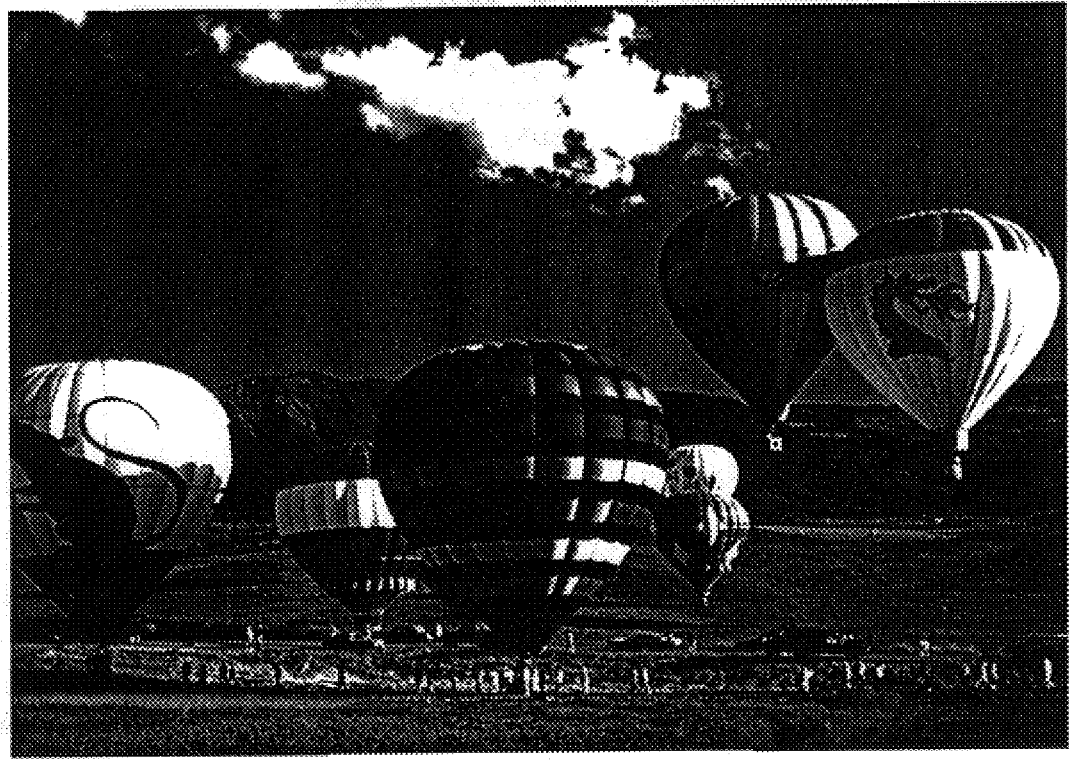
FIG. 2 is a reproduction in grey scale images for an example consisting of a high-quality color photograph used to test the invention.
Figure 2:
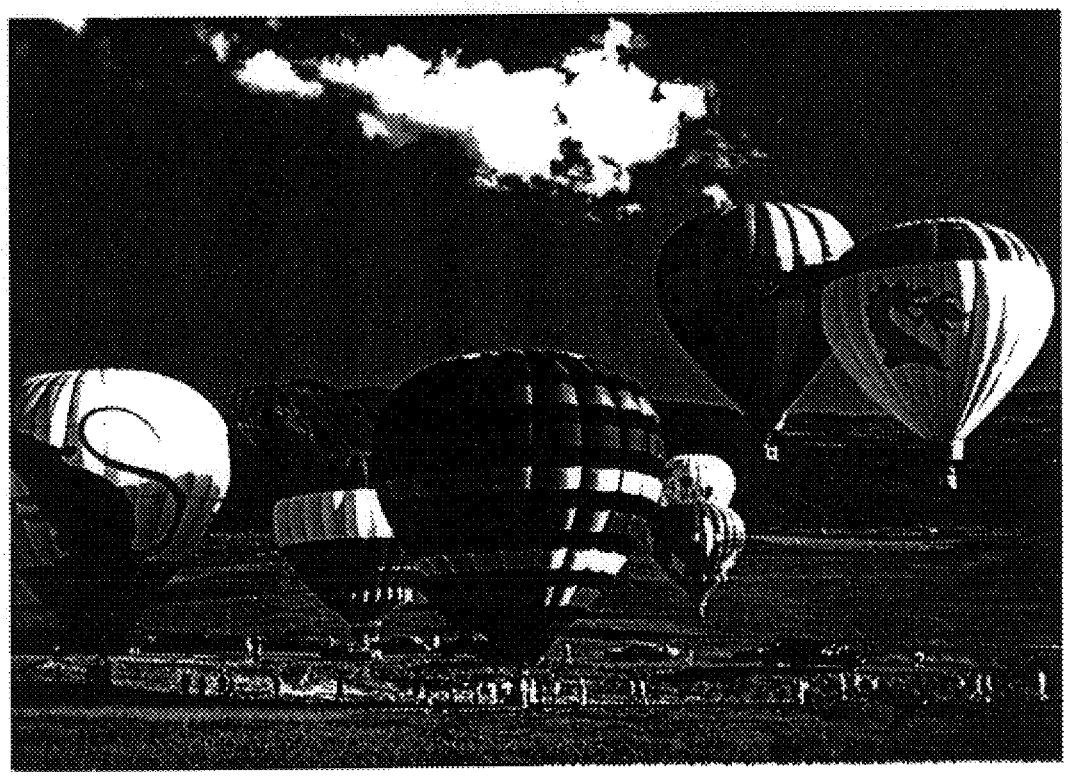

FIG. 2 is a reproduction in grey scale of a 24-bit Truecolor photograph having a noise level of one or two bits at most. Comparing the original image and the image after embedding using 3 bits of the host data shows little evidence of the noise added by the invention. The lower image in FIG. 2 contains 50% auxiliary data, yet the invention preserves the appearance of the original image.

Figure 3:
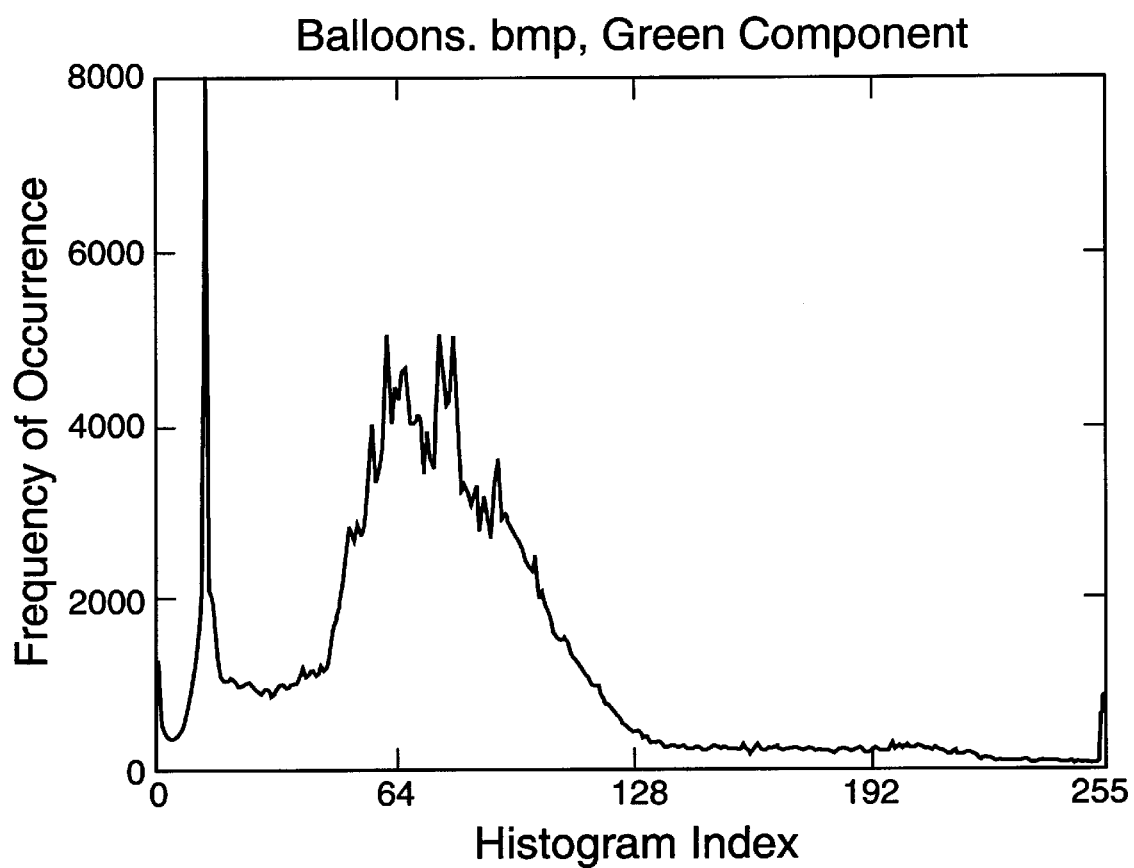
FIG. 3 is a graph of the histogram of the green color component of the original high-quality photographic image example in FIG. 2 (top).
Figure 4:
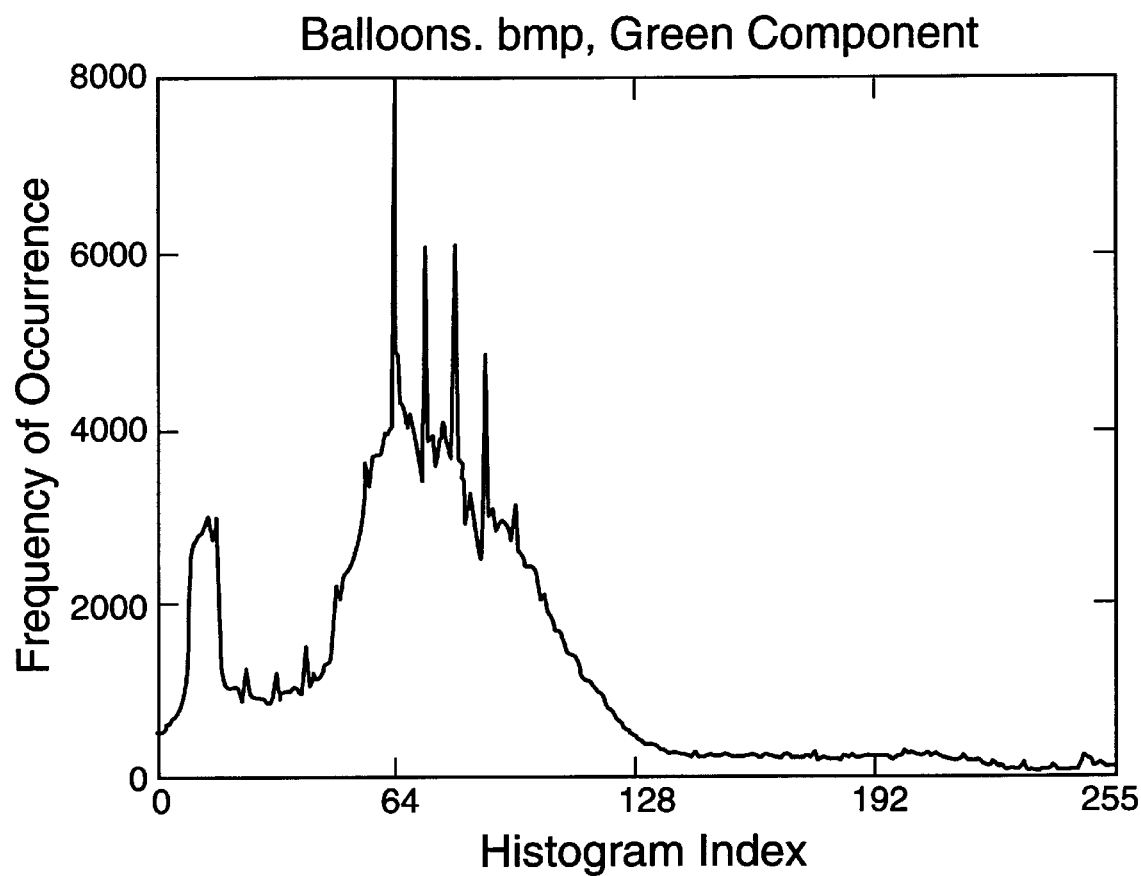
FIG. 4 is a graph of the histogram of the green color component of the modified high-quality photographic image example in FIG. 2 (bottom).

FIGS. 3 and 4 show the histogram of the green color component, for the images in FIG. 2. After applying the invention, the histogram in FIG. 4 differs from the original, which is shown in FIG. 3. However, the invention preserves the features of the histogram, and the image appears substantially unchanged from the original.

Figure 5:
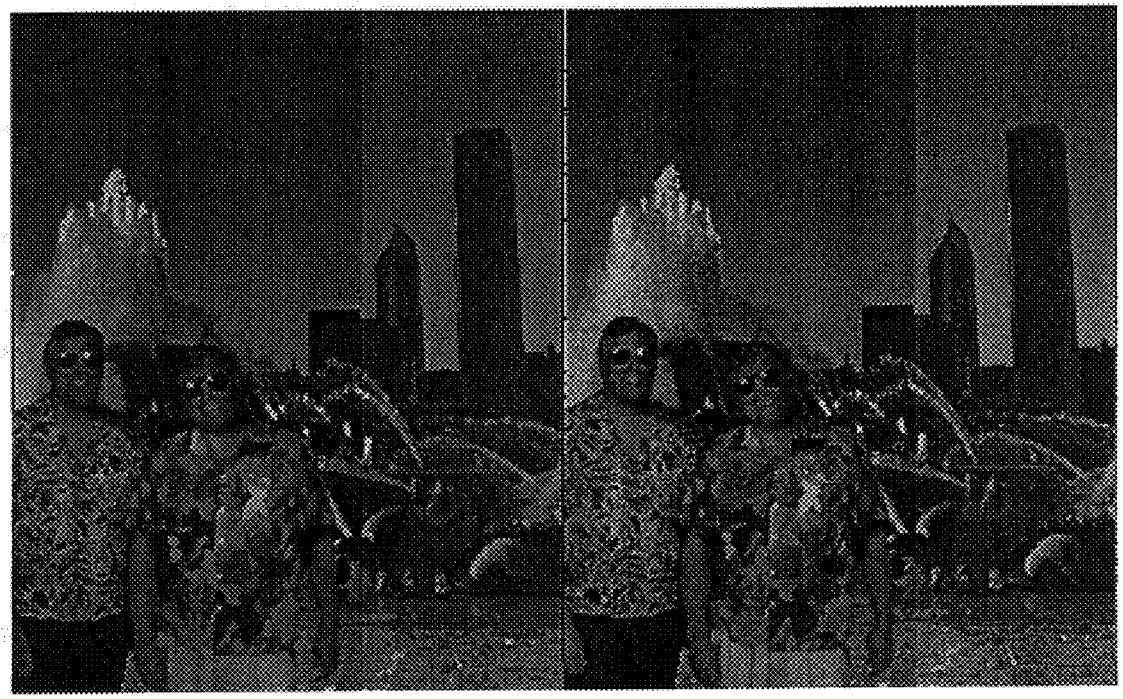
FIG. 5 is a reproduction in grey scale images for an example consisting of a color composite illustration used to test the invention.
Figure 6:
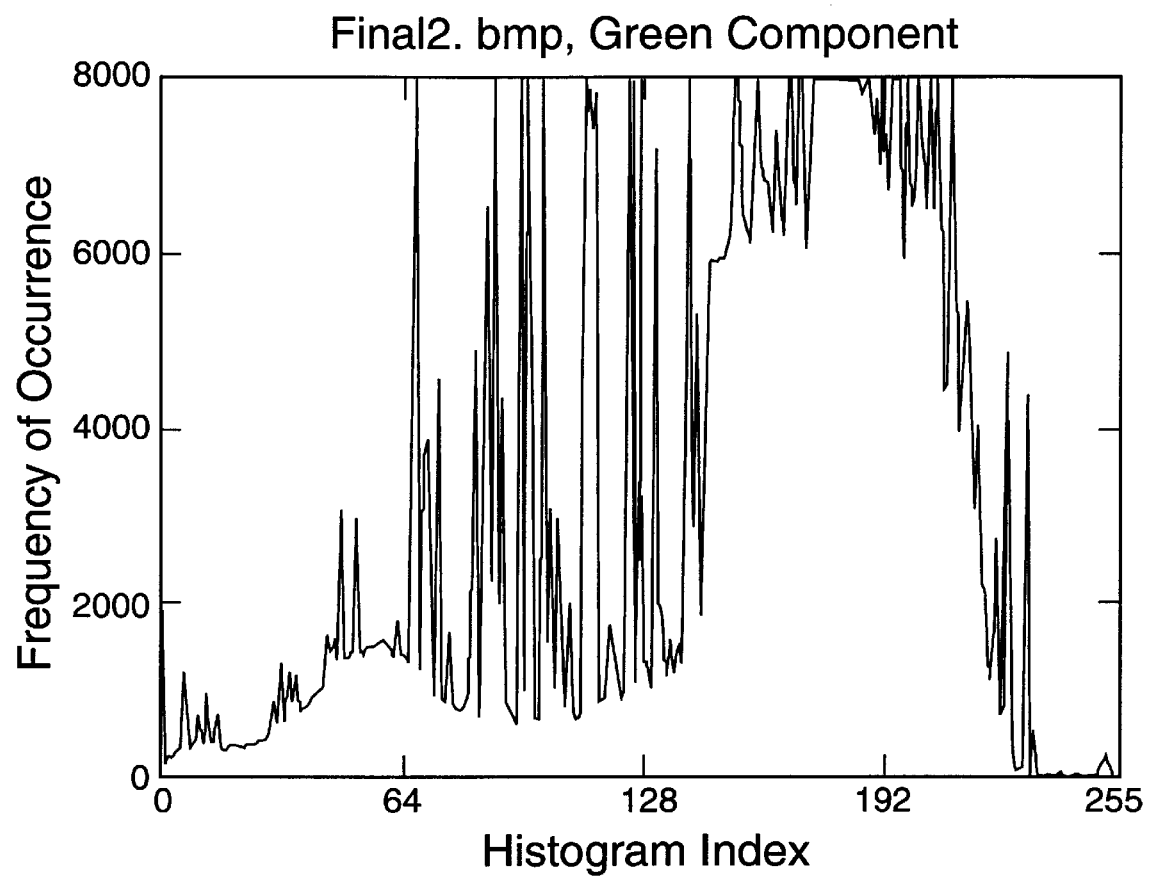
FIG. 6 is a graph of the histogram of the green color component of the original composite illustration image example in FIG. 5 (left).

Reference is now directed to the left image in FIG. 5, a reproduction in grey scale of a 24-bit Truecolor composite image. The composite image is constructed by manipulating separate photographs of the individuals, taken in a studio, and of the Chicago skyline. The image was manipulated digitally by a graphics artist to shade the sky, and to lighten a vertical strip on the right side, for the purpose of adding caption information. Composite images are used commonly for illustrations in publications. Owing to the composition process, the noise level varies widely in a composite image. The histogram of the green component of the left image of FIG. 5 is shown in FIG. 6, and illustrates the large variations caused by manipulating images in the composition process.

Figure 7:
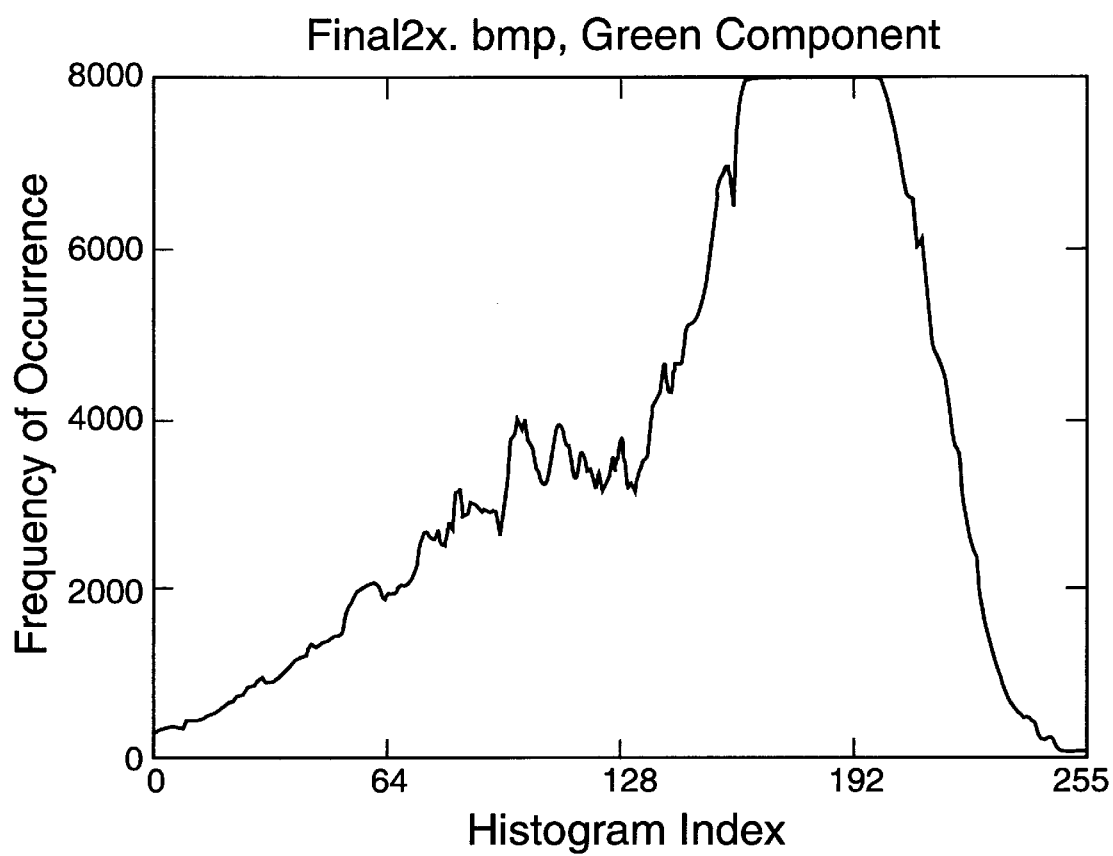
FIG. 7 is a graph of the histogram of the green color component of the modified composite illustration image example in FIG. 5 (right).

The right image in FIG. 5 shows the result of applying the invention to embed the five lowest bits of the pixels in the composite image. The noise level is raised in some parts, notably in the sky background. The histogram of the right image of FIG. 5 is shown in FIG. 7, and is smooth, in comparison with the original, shown in FIG. 6. After embedding data, the histogram is consistent in appearance with a photographic source such as is illustrated in FIG. 2. For n=5, five bits per pixel are embedded into each pixel, in each of the three color planes of the 24-bit Truecolor-format image. In the right image in FIG. 5, 15 of the 24 bits, or 62.5% of the host image size, contain auxiliary information not related to the pixel values.

Figure 8:
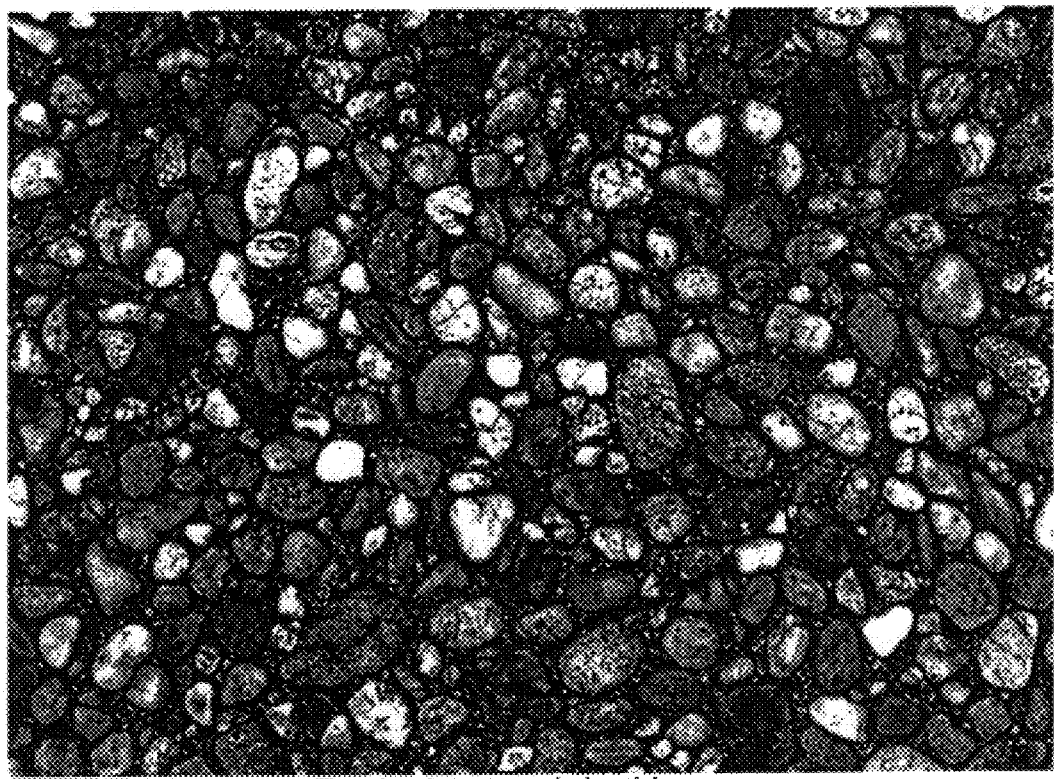
FIG. 8 is a reproduction in grey scale images for an example consisting of a noisy photograph used to test the invention.
Figure 8:
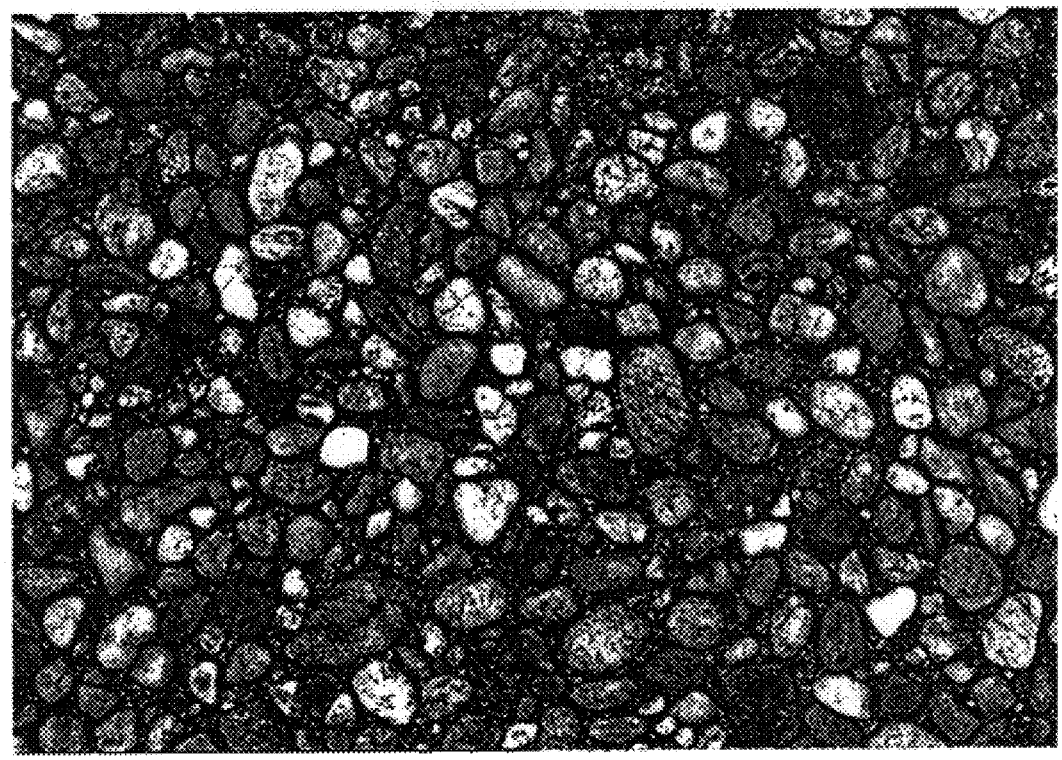

FIG. 8 is a reproduction in greyscale images of a high-quality 24-bit Truecolor photograph of a detailed subject, rocks in a cobblestone pavement. The subject detail provides variations in the image that mimic the effect of noise, permitting a more aggressive application of the method of the present invention. The lower image in FIG. 8 shows the result of applying the invention to the lowest 6 bits of the original image. The lower image contains 75% auxiliary data.

Figure 9:
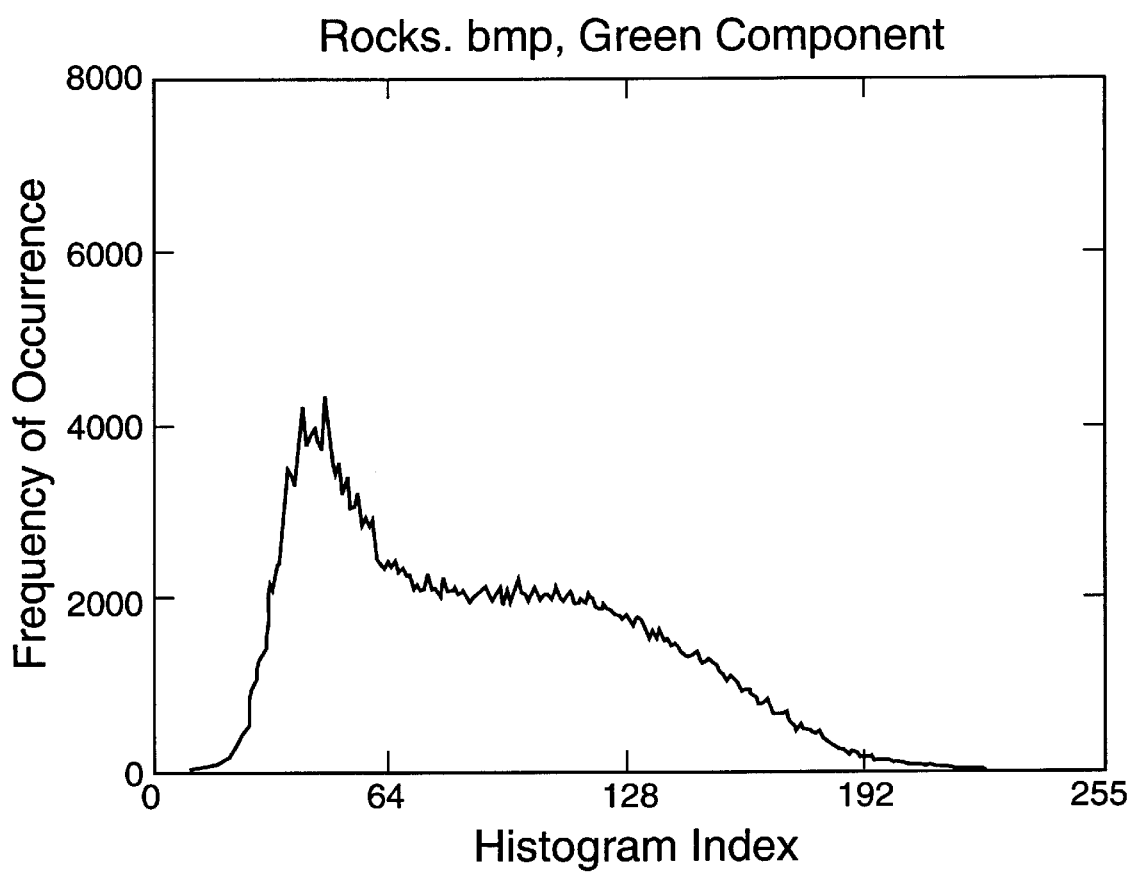
FIG. 9 is a graph of the histogram of the green color component of the original noisy photographic image example in FIG. 8 (top).
Figure 10:
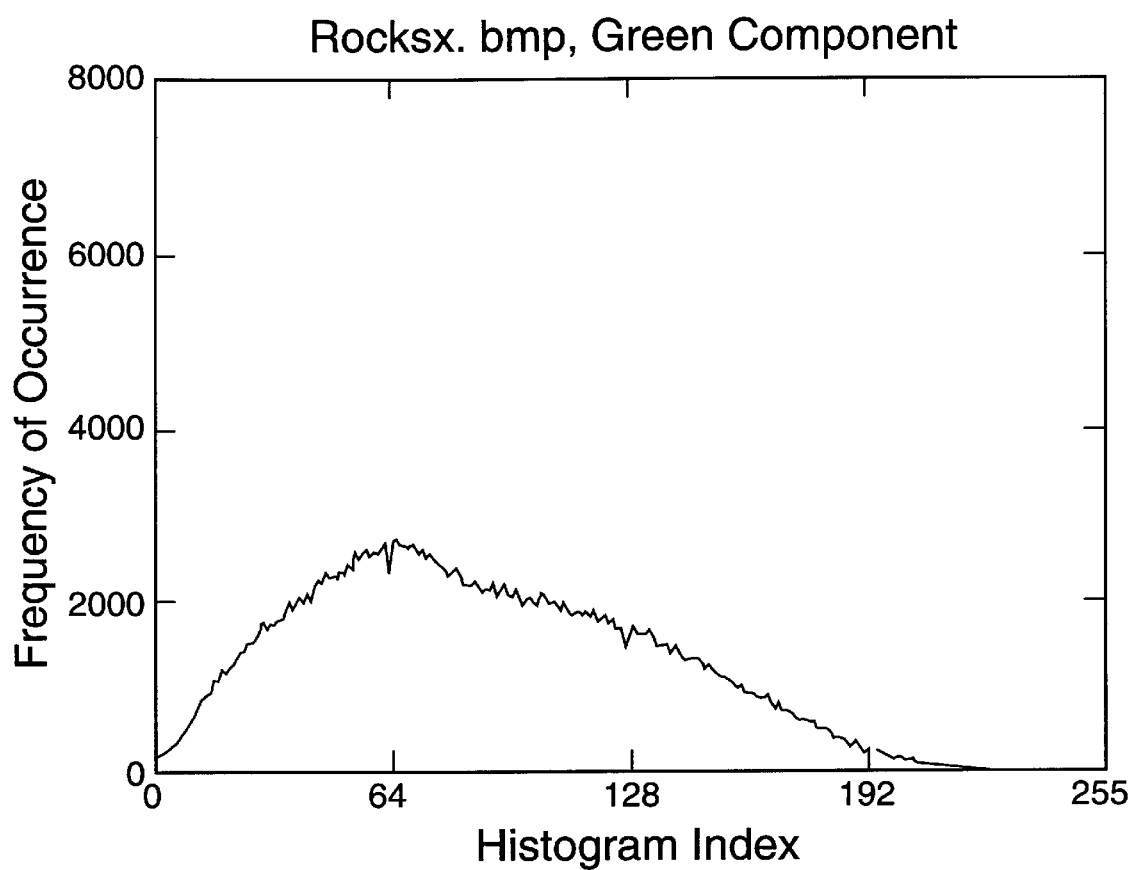
FIG. 10 is a graph of the histogram of the green color component of the modified noisy photographic image example in FIG. 8 (bottom).

FIGS. 9 and 10 show the histogram of the green color component, for the images shown in FIG. 8. After applying the method of the present invention, the histogram in FIG. 10 differs markedly from the original, shown in FIG. 9. However, in spite of the histogram differences, the detail in the original image supports the addition of considerable noise to the photograph. The method according to the invention succeeds in replacing the majority of the image content with auxiliary data.

The invention divides the host value data-space into blocks of size $2^n$, where n is the number of host data bits used to encode auxiliary data. The data values are modified modulo the blocksize. As previously discussed, the replacement bits affect the host data values by less than the amount of comparable high bit-rate coding using bit-slicing methods. Table 1 compares, for comparable error, the size of the auxiliary data for images embedded with the invention and a bit-slice method. The right column in Table 1 shows the improvement in size given by the invention.

TABLE 1

| | ME versus Bit-slice algorithms | | |
|---|---|---|---|
| no. of bits, n | ME size (%) | Bit-slice size (%) | ME improvement (%) |
| 1 | 12.5 | 12.5 | 0 |
| 2 | 25.0 | 12.5 | 12.5 |
| 3 | 33.3 | 25.0 | 8.3 |
| 4 | 50.0 | 33.3 | 16.7 |
| 5 | 62.5 | 50.0 | 12.5 |
| 6 | 75.0 | 62.5 | 12.5 |

Referring to Table 1, for n=1, the invention and bit-slice algorithms perform identically. However, for more than one embedding bit (n>1), the invention exceeds bit-slicing for the amount of information embedded. In particular, n=6 is useful with the method of the present invention (as shown in FIG. 8), while it is not useful for bit-slicing.

Embedding with the method of the present invention differs from bit-slicing in the treatment of the next highest bit, in the n low-order bits of the host data sample. In bit-slicing, n bits are replaced with n bits from the auxiliary data. In the method according to the present invention, if the bits are numbered from the least significant by k=1,2, ..., n−1, n, then the $(n+1)^{th}$ bit in the new host data pixel depends only the value of the auxiliary data bit.

In the method of the present invention, the $(n+1)^{th}$ bit of the new host pixel depends on the difference between a quantity, $X_2$, and the auxiliary data, as seen in the relations in Equation 3a. The error introduced by embedding with the invention is thus reduced to O(n−1), in comparison with bit-slice methods having error of O(n).

A feature of the present invention reduces further the error caused by replacing n bits in the host data. As taught above, the error committed by applying the invention is less than for bit-slice embedding, because the difference between the host image pixel value and the embedded data value is reduced to one-half the modular block size. Further error reduction thus is possible, by increasing the correlation of the auxiliary and host data.

The invention embeds bits drawn from the auxiliary data into the host data by replacing the value h with h' (Equation 3). Thus, the error is the difference between these two values. Assume a number, m+1, of host values can be drawn randomly from the host data. The m+1 values in the sample are related to one another statistically through the host data histogram.

The method according to the present invention takes m samples, each of bit-size n, from the auxiliary data. The m values taken from the auxiliary data sample are related to one another according to the statistical properties of the auxiliary data, and are assumed to be uniformly random, if encryption or loss-less compression is performed prior to processing the auxiliary data.

In this procedure, the m data values are embedded sequentially into a permutation of m host data values, using the procedure as taught above to embed each value. The permutation is selected to minimize the total error of the m values embedded into the host image pixel offsets.

The $(m+1)^{th}$ value drawn from the image data is used to contain an index for the permutation used for the embedding. The permutation index is embedded along with the auxiliary data, as taught above.

Permuting the host-data values to minimize error reduces further the degradation of the host values, at the expense of complicating the embedding algorithm, and of reducing the embedding space by the amount required to contain the permutation indices.

The extraction sequence requires that the m+1 values be retrieved, and the permutation index decoded to recover the particular permutation used for embedding the sequence of m data values. Extracting the embedded data requires drawing the identical sequence of host data values. The permutation index is recovered from the first of the m+1 pixels with the process of the present invention as taught in Equation 4 above. The index can be stored in any of the m+1 pixels, and the remaining m values permuted, according to the particular implementation of the algorithm. The remaining m host values are ordered according to the permutation generated from the index, and the auxiliary data are recovered by using the process of the invention on each, in sequence.

The reduction in error given by permuting the host-image pixel samples is estimated empirically, for real image data. The image histogram provides the information required to estimate the error made by embedding, including the error committed by embedding a permutation index and data. The histogram is the probability density for the value of a pixel drawn randomly from the host image. The present invention modifies a pixel value according to the value of the auxiliary data. To estimate the error, we first consider the random auxiliary data.

It is incorrect to estimate error by considering random pixel-offset values for the host data, because the pixel offsets follow the histogram probability density. A pixel-value offset, $X_2$ (Equation 3), derives from the host image value modulo the block size. Because the invention uses more than the least significant bit, the offset values correlate with the host data. For most host data, as one considers successively lower bit-levels, the pixel-offset values transition from correlation with the image to a random distribution. Generally, the pixel-offset values correlate with the host data for block sizes much above N=4, or n=2 bits.

Integrating the normalized probability density function gives the probability distribution function. Numbers drawn from a uniform generator enter the distribution function table as a probability, and sample pixel values according to their distribution in the image.

To estimate the error of the permutation process, the pixel-offset value samples drawn from an image probability distribution are combined with a sequence of uniformly random values representing an auxiliary data stream. The process determines the permutation of the pixel-offset values giving the least total error for each sequence of auxiliary data values. A minimization algorithm or an exhaustive search determines the particular permutation sequence.

To find the permutation giving minimum error, one would compute an error matrix $E_{kl}$ for k,l=1,2,3, . . . ,m combinations of the host and auxiliary data samples. For m permutations, one draws the number m pixel values from the host image, and another m data values from the auxiliary information to be embedded. The matrix is defined by $$E_{kl}=|X_{2k}-y_l|, \qquad 5)$$

where $X_{2k}$ is a host data pixel-offset value and $y_l$ is an auxiliary value to be embedded.

Summing the error matrix rows to calculate the total error for each auxiliary value is given by:

$$e_1 \sum_k E_{kl}. \qquad 6)$$

Consider an example to demonstrate operation of this algorithm. Take m=5, n=7, and assume values for $X_{2k}$=12, 19, 36, 55, 63; and for $y_l$=50, 12, 48, 32, 1. Differencing the values, the error matrix and row errors are:

|   | k   |     |     |     |     |           |
| - | --- | --- | --- | --- | --- | --------- |
| l | 1   | 2   | 3   | 4   | 5   | row error |
| 1 | 38  | 31  | 14  | 5   | 13  | 101       |
| 2 | 0   | 7   | 24  | 43  | 51  | 125       |
| 3 | 36  | 29  | 12  | 7   | 15  | 99        |
| 4 | 20  | 13  | 4   | 23  | 31  | 91        |
| 5 | 11  | 18  | 35  | 54  | 62  | 180       |

The permutations are found by processing the row error sums, $e_l$ (l=1,2,3, . . . ,m), in decreasing order of magnitude. The first auxiliary value $y_l$ chosen is paired with the pixel-offset value of $X_{2k}$ that gives the minimum error, $E_{kl}$. Thus, the first $y_l$ value to be processed is l=5, because the row error (180) is the largest. The minimum error in the row occurs for k=1. The next smallest row error is 125, and it corresponds to l=2. The minimum error in the row occurs for k=1, but this value was selected previously. Thus, the next smallest error occurs for k=2. Continuing the selection mines the permutation sequence:

| l        | 1 | 2 | 3  | 4  | 5  |
|----------|---|---|----|----|----|
| k        | 4 | 2 | 3  | 5  | 1  |
| $E_{kl}$ | 5 | 7 | 12 | 31 | 11 |

The total error for the permutation is 66, compared with 119, the average of the row errors for the matrix. The error per value embedded is 66/5≈13. The average error per value for the average of the row errors above is 24. For this example, the algorithm gives about 55% error reduction.

An alternate method of finding the permutation giving the minimum error would be by an exhaustive search of all possibilities. Numerical tests show the algorithm taught herein provides results which differ little from an exhaustive search result.

The average error of applying the invention to the images in FIGS. 2, 5, and 8 with random auxiliary samples is given in Table 2 as a "bit equivalent error." The bit-equivalent error is the base-two logarithm of the average error in the pixel-offset value. The bit equivalent error is interpreted as the number of bits representing the error value. For bit-slice methods, with n bits, the average bit-equivalent error equals the error of the present invention for n+1 bits. Table 2 gives results from the method of the present invention without including the permutation, for $10^4$ trials.

TABLE 2

ME Method Bit Equivalent Errors

| No. of bits | balloons.bmp | final2.bmp | rocks.bmp |
|---|---|---|---|
| 7 | 4.74 | 4.79 | 4.77 |
| 6 | 3.77 | 3.78 | 3.75 |
| 5 | 2.79 | 2.79 | 2.79 |
| 4 | 1.84 | 1.84 | 1.83 |
| 3 | 0.88 | 0.89 | 0.92 |

The bit-equivalent errors in Table 2 show the substantial gain of about one bit that the present invention offers in comparison with conventional bit-sliced steganography. For example, for embedding with seven bits of the image pixel, the present invention gives errors equivalent to about five bits. For three bits, the invention error is about one bit.

Permuting the pixel values reduces the embedding error even more. The algorithm taught above was used to determine a permutation that reduces the total error for the embedded data-values, and the index for the permutation was embedded separately. Table 3 gives results for permuting the host data values. The image used Table 3 is the final2.bmp picture, shown in FIG. 5.

TABLE 3

Permuted Process Bit Equivalent Errors

| Embedding bits | Number of Permutations |  |  |  |  |
|---|---|---|---|---|---|
|   | 5 | 4 | 3 | 2 | 1 |
| 7 | 4.31 | 4.60 | 4.89 | 5.17 | 4.79 |
| 6 | n/a | 3.52 | 3.86 | 4.15 | 3.78 |
| 5 | n/a | 2.47 | 2.81 | 3.15 | 2.79 |
| 4 | n/a | n/a | 1.74 | 2.11 | 1.84 |
| 3 | n/a | n/a | 0.72 | 1.04 | 0.89 |

In Table 3, the "n/a" entries are permutations for which the embedding bit level does not permit embedding the permutation index. For example, for 5 permutations, there are 120 possible indices, but using six bits in a pixel permits storing no values larger than $2^6-1=63$. Thus, the number of permutations usable depends on the number of image pixel bits used for embedding.

In Table 3, the column for one permutation indicates the result of applying the present invention without the permutation process (Table 2). The greatest amount of information is embedded using seven bits. The error for five levels of permutation is 4.31 bits compared with 4.79 bits with no permutations, an improvement of 10%. For the lowest number of embedding bits tested (3), the error with three permutations is 0.72 bits compared with 0.89 bits for no permutations, an improvement of 19%. The improvement in error is largest for embedding with few image data-value bits, and for three permutations.

The average error in Table 3 is larger than the unpermuted (m=1) value for some permutations. For permutations of two and three, for five, six, and seven-bit embedding, the error is large because the unpermuted storage of the permutation index introduces an error greater than the error reduction by permuting. The necessity of embedding a permutation index increases the average error and negates the effect of permuting a small number of values.

Even though the permutation index increases the error in Table 3, only a fraction, 1/(m+1), of the host image pixels suffer the larger error. The majority of the host pixels have smaller errors, owing to the use of permutation process. The visual appearance of the image is measured better by neglecting the permutation index error contributions in Table 3.

Table 4 gives the errors for the same example as in Table 3, without the error contribution of the permutation index. The errors in Table 4 are calculated by an exhaustive-search algorithm to determine the best permutation.

TABLE 4

Permuted Process Errors Without Index Error

| No. of bits | 5 | 4 | 3 | 2 | 1 |
|---|---|---|---|---|---|
| 7 | 3.64 | 3.74 | 3.82 | 3.88 | 4.79 |
| 6 | n/a | 2.74 | 2.83 | 2.88 | 3.78 |
| 5 | n/a | 1.78 | 1.85 | 1.90 | 2.79 |
| 4 | n/a | n/a | 0.94 | 0.94 | 1.84 |
| 3 | n/a | n/a | 0.06 | 0.07 | 0.89 |

For seven-bit embedding, with three and two permutations, the errors calculated without including the effect of embedding the permutation index are 3.82 and 3.88, respectively, compared with 4.89 and 5.17 (Table 3), when the permutation index error is included. Thus, by permuting seven-bit embedding five times, the perceived, or visible-appearance, error reduces by more than one bit. In this case, ⅛ of the pixels having the index values have error (4.31 bits, Table 3) larger than the average error in Table 4.

Using permutations of two and three, for 3-bit embedding, the error in the perceived image is negligible. Moreover, the error from embedding the permutation indices is less than one-bit, for the ¼ of the image pixels containing permutation indices (Table 3). Thus, it is possible to embed data using the lowest three bits of the host image with perceived, or visual-appearance errors of less than one bit.

It is now helpful to refer to FIG. 11, wherein a partial listing of computer code in the C++ language is printed. The code listed in FIG. 11 demonstrates the method of embedding auxiliary bits according to the method of the invention. A class member function EmbedModError() performs the embedding of auxiliary data into the host image data value. The host value is passed to the function as a calling argument, in line 10, as a pointer to the host image value, named by the variable pixel. A second calling argument is a pointer to an unsigned long variable named maxval holding the count of the number of bits embedded.

Lines 17 and 18 in FIG. 11 calculate the block index, $X_1$ and the pixel offset value, $X_2$. In line 20, the auxiliary data value is drawn from the bit stream using a function named GetBits(). The number of bits sliced is passed to the function with the class member variable named no_bits_sliced. Lines 22 through 27 implement the algorithm to calculate the replacement value for the host data value. Line 4, FIG. 11 (page 2) replaces the original host data value with the new value containing the auxiliary data. Line 5 increments the counter by the number of bits sliced in the host pixel value.

Referring now to FIG. 12, the class member function named ExtractSlicedBits() that extracts the embedded data with the invention is shown. Line 12 defines a class member function to extract information from the host data value. Pointers to the host value and to a counter holding the number of bits extracted are passed as calling arguments. The variable named pixel points to the host data value, and the variable named maxval points to the counter.

The extracted value is calculated in line 21 by remaindering the host pixel value with the size of the embedding block, stored in the member structure element named data_header.mod_block_size. In line 24, the auxiliary value extracted from the host pixel value is placed into the auxiliary bit stream with a routine named PutBits(). The member structure element data_header.no_bits_sliced is passed to specify the number of bits to be inserted into the auxiliary data stream. The counter is incremented in line 27, and the routine returns a flag indicating success or failure in line 28.

As with the data embedding process disclosed in the copending application, the invention protects the auxiliary embedded data with a key. The key is used to generate the sequence of pixels used to embed the auxiliary data values. Without the key, an unauthorized user cannot extract the embedded information. The security of the embedded data require protection of the key. One way of protecting the key is to encrypt it using public-key, or another encryption process. The present invention permits an encrypted key to be placed into the host image file, preventing extraction by unauthorized persons.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments, and with various modifications as are suited to the particular use contemplated. It is intended that the scope of the invention be defined by the claims appended hereto.

What is claimed is:

1. A method of embedding auxiliary data into digital host data of any kind containing noise in the low-order bits comprising the steps of:

selecting values from said digital host data in a sequence determined by a digital key;

creating a digital representation of said auxiliary data in the form of a sequence of individual bit values;

selecting from said digital host data a block of values having a center and a first offset value obtained from said center of said block;

replacing individual host data values with a second block offset value determined from said auxiliary data; and outputting said replacement values with said auxiliary data embedded into a file format specified for said digital host data.

2. The method as described in claim 1 further comprising the step of combining said auxiliary data with predetermined information indicative of the presence of said auxiliary data, its file name, and file size, said step to be performed after the step of digitizing said auxiliary data.

3. The method as described in claim 1 further comprising the step of modifying a histogram of said host data for the purpose of identifying said host data for copyright purposes.

4. The method as described in claim 1, wherein said digital representation of said host data originates from a color image comprising color intensity components consisting of digital values representing said color intensity components.

5. The method as described in claim 1, wherein said digital representation of said host data originates from a color image comprising color components consisting of digital values for hue, saturation, and intensity.

6. The method as described in claim 1, wherein said digital representation of said host data originates from a black and white image represented by intensity components consisting of digital values.

7. The method as described in claim 1, wherein said digital representation of said host data originates from an audio source.

8. The method as described in claim 1, wherein said digital representation of said host data originates from X-ray, Magnetic Resonance, Positive Electron Tomography, Ultrasound, and Computer Aided Tomagraphic Imaging data.

9. The method as described in claim 1, wherein said digital representation of said host data originates from personal security and identification information.

10. The method as described in claim 1, wherein said representation of said digital host data originates from images made with a camera producing digital images.

11. The method as described in claim 1, wherein said representation of said digital host data originates from, or is relayed by a computer network or a satellite of the Earth.

12. A method of reconstructing auxiliary data from a machine readable digital host data representation into which said auxiliary data has been emedded comprising the steps of:

extracting said auxiliary data from said host data representation in a sequence determined by a digital key;

interpreting said extracted auxiliary data according to the remainder values of a block size that is a binary power of two; and verifying said auxiliary data by examining said remainder values.

* * * * *